(12) United States Patent
Yamada

(10) Patent No.: US 11,276,962 B2
(45) Date of Patent: Mar. 15, 2022

(54) CONNECTOR AND MANUFACTURING METHOD THEREOF

(71) Applicant: Sumitomo Wiring Systems, Ltd., Mie (JP)

(72) Inventor: Hiroki Yamada, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 186 days.

(21) Appl. No.: 16/702,859

(22) Filed: Dec. 4, 2019

(65) Prior Publication Data
US 2020/0185858 A1 Jun. 11, 2020

(30) Foreign Application Priority Data

Dec. 6, 2018 (JP) .............................. JP2018-228800

(51) Int. Cl.
| | | |
|---|---|---|
| H01R 13/631 | (2006.01) | |
| H01R 13/436 | (2006.01) | |
| H01R 43/24 | (2006.01) | |
| H01R 9/24 | (2006.01) | |
| H01R 13/514 | (2006.01) | |
| H01R 43/18 | (2006.01) | |
| H01R 13/504 | (2006.01) | |
| H01R 13/405 | (2006.01) | |

(52) U.S. Cl.
CPC ......... *H01R 13/631* (2013.01); *H01R 9/2458* (2013.01); *H01R 13/405* (2013.01); *H01R 13/4362* (2013.01); *H01R 13/504* (2013.01); *H01R 13/514* (2013.01); *H01R 43/18* (2013.01); *H01R 43/24* (2013.01)

(58) Field of Classification Search
CPC .. H01R 13/631; H01R 9/2458; H01R 13/405; H01R 13/4362; H01R 13/504; H01R 13/514; H01R 43/18; H01R 43/24; H01R 13/02; B29C 45/14418; B29C 45/14639; B29C 45/1671
See application file for complete search history.

(56) References Cited

U.S. PATENT DOCUMENTS

| | | | | |
|---|---|---|---|---|
| 5,846,100 A | * | 12/1998 | Ogawa | H01R 43/24 439/736 |
| 5,926,952 A | * | 7/1999 | Ito | H01R 43/18 29/883 |
| 6,527,989 B1 | * | 3/2003 | Onoda | B29C 45/14065 264/40.1 |

(Continued)

FOREIGN PATENT DOCUMENTS

JP 2004-127571 4/2004

*Primary Examiner* — Travis S Chambers
(74) *Attorney, Agent, or Firm* — Gerald E. Hespos; Matthew T. Hespos; Michael J. Porco

(57) ABSTRACT

A connector (1) includes first terminals (3A), a first resin core (2A), second connector terminals (3B), second resin cores (2B) and an outer resin part (4). Base ends (312) of inner end parts (31A) of the first terminals (3A) face a second exposed surface (21B) of the second resin core (2B) with a clearance (S) formed between the base end parts (312) and the second exposed surface (21B). Tips (311) of the inner end parts (31A) of the first terminals (3A) are formed with bent tips (311A) projecting away from the second exposed surface (21B). The second exposed surface (21B) has a size to entirely surround the inner end parts (31A) of the first terminals (3A).

6 Claims, 11 Drawing Sheets

(56) References Cited

U.S. PATENT DOCUMENTS

| | | | | |
|---|---|---|---|---|
| 6,796,852 B2* | 9/2004 | Okamoto | ............... | H01R 43/24 |
| | | | | 439/516 |
| 6,837,746 B2* | 1/2005 | Okamoto | ............... | H01R 43/24 |
| | | | | 264/263 |
| 7,682,204 B2* | 3/2010 | Tokairin | ............... | H01R 13/405 |
| | | | | 439/736 |
| 7,958,630 B2* | 6/2011 | Matsuoka | ......... | B29C 45/14639 |
| | | | | 29/848 |
| 8,118,583 B2* | 2/2012 | Nagashima | ....... | B29C 45/14418 |
| | | | | 425/330 |
| 8,545,265 B2* | 10/2013 | Sakamoto | ......... | B29C 45/14467 |
| | | | | 439/606 |
| 10,944,230 B2* | 3/2021 | Ito | ........................ | H05K 5/0026 |
| 2008/0012173 A1* | 1/2008 | Asao | ................ | B29C 45/14639 |
| | | | | 264/255 |

\* cited by examiner

CONNECTOR AND MANUFACTURING METHOD THEREOF

BACKGROUND

Field of the Invention

The invention relates to a connector with connector terminals and a manufacturing method thereof.

Related Art

Connectors are used in control devices of machines and in electronic control units whose operations are controlled by the control device. Connector terminals may be arranged in a case of the connector, and the case may be made of resin by performing insert molding. Further, a core resin part having connector terminals inserted therein may be molded and this core resin part may be arranged in a connector case by insert molding.

Japanese Unexamined Patent Publication No. 2004-127571 discloses a board connector molded with terminal fittings inserted, and a case body is molded between a fixed mold and a movable mold with the board connector inserted. A connector with terminal fittings having an undercut shape is molded by two-stage insert molding.

End parts of connector terminals mostly project linearly from a mounting portion of a connector case to enable the mounting of a mating connector. However, depending on the type of the mating connector, board or the like, the end parts of the connector terminals may be made resiliently deformable so that an undue load is not applied to the connector terminals when mounting the connector to the mating connector, the board or the like.

In this case, it is considered to form bent portions on the end parts of the connector terminals, and these bent portions may have an undercut shape. Thus, it is considered to perform two-stage insert molding to mold a core resin part having the connector terminals inserted therein and to mold a connector case having this core resin part inserted therein.

However, holding the core resin part in a mold is a problem during two-stage insert molding. In this case, depending on the shape of the end parts of the connector terminals formed with the bent portions in the core resin part, a resin material for molding the connector case may intrude to the peripheries of the end parts of the connector terminals.

The invention was developed in view of such a problem and an object is to provide a connector and a manufacturing method thereof enabling a connector case to be molded easily even if inner end parts of connector terminals have a bent shape to face the connector case composed of a core resin part and an outer resin part.

SUMMARY

A first aspect of the invention relates to a connector with terminals, a resin core configured to cover remaining parts of the terminals with inner end parts and outer end parts of the terminals projecting therefrom, and an outer resin part configured to cover a remaining part of the resin core with a surface of the resin core exposed. The exposed surface includes a projecting exposed surface and a parallel exposed surface, and the inner end parts of the terminals project from the projecting exposed surface. The parallel exposed surface is perpendicular to the projecting exposed surface and parallel to base ends of the inner end parts with a clearance formed between the base end parts and the parallel exposed surface. Bent tips are formed on the inner end parts and are project away from the parallel exposed surface. The parallel exposed surface is dimensioned to entirely surround the inner end parts of the terminals when viewed in a direction in which the inner end parts and the parallel exposed surface face each other.

The base ends of the inner end parts of the terminals are arranged to face the parallel exposed surface of the resin cores, but do not form an undercut shape during resin molding. In this context, the expression "undercut shape" means the shape of a part that interferes with a mold when a resin molded article is taken out from the mold after molding, i.e. the shape of a part that is difficult to take out from the mold unless a slide core is provided in the mold Specifically, the resin core having the terminals arranged therein is molded separately from the outer resin part. Thus, the connector can be molded with the base ends of the inner end parts of the terminals and the parallel exposed surface of the resin core facing each other without the inner end parts of the terminals forming the undercut shape when the outer resin core is molded. In this way, the structure of a mold for the outer resin part is simplified.

The inner end part of the terminal is composed of the base end parallel to the parallel exposed surface and the bent tip that is bent with respect to the base end to project away from the parallel exposed surface. In this way, when the bent tip of the inner end part of the terminal is inserted into a mating connector, a board or the like, this inner end part can be deflected resiliently to deform at least one of the base end and a boundary between the base end and the bent tip. Thus, insertion of the bent tip of the inner end of the terminal into the mating connector, the board or the like is facilitated.

When viewed in the direction in which the base ends of the inner end parts and the parallel exposed surface face each other, the parallel exposed surface of the resin core is dimensioned to entirely surround the inner end parts of the connector terminals. In this way, when the outer resin part is molded with the resin core inserted, the parallel exposed surface of the resin core can be held by the mold to surround the inner end parts of the connector terminals. Thus, a resin material for molding the outer resin part cannot intrude to the peripheries of the inner end parts of the connector terminals. As a result, even if the inner end parts of the connector terminals have a bent shape to face a connector case, the connector case can be molded easily.

Therefore, according to this aspect of the invention, the connector case can be molded easily even if the inner end parts of the connector terminals have the bent shape to face the connector case composed of the resin core and the outer resin part.

A second aspect of the invention is directed to a connector with first terminals and second terminals. A first resin core covers remaining parts of the first terminals with inner end parts and outer end parts of the first terminals projecting therefrom. A second resin core covers remaining parts of the second terminals with inner end parts and outer end parts of the second terminals projecting therefrom. An outer resin part covers a remaining part of the first resin core and a remaining part of the second resin core with a first exposed surface formed on a part of the first resin core and a second exposed surface formed on a part of the second resin core exposed. Base ends of the inner end parts of the first terminals face the second exposed surface with a clearance formed between the base ends and the second exposed surface. Bent tips are formed on the inner end parts of the first terminals and project away from the second exposed surface. The second exposed surface is dimensioned to entirely surround the inner end parts of the first terminals when viewed in a direction in which the inner end parts of the first terminals and the second exposed surface face each other.

The connector of this second aspect of the invention may be configured such that the base ends of the inner end parts of the first terminals do not form an undercut shape during resin molding, even if the base ends of the inner end parts of the first terminals are arranged to face a connector case composed of the first resin core, the second resin core and the outer resin part. Specifically, the first resin core having the first terminals arranged therein and the second resin core having the second terminals arranged therein are molded separately from the outer resin part. Thus, the base ends of the inner end parts of the first terminals and the second exposed surface of the second resin core can face each other without the base ends of the inner end parts of the first terminals forming the undercut shape. In this way, the structure of a mold for molding the outer resin part is simplified.

The inner end part of the first terminal may be composed of the base end parallel to the second exposed surface and the bent tip bent with respect to the base end part to project away from the second exposed surface. In this way, when the bent tip of the inner end of the first terminal is inserted into a mating connector or the like, this inner end can be deflected resiliently to deform at least one of the base end and a boundary between the base end and the bent tip. Thus, insertion of the bent tip of the inner end part of the first terminal into the mating connector or the like can be facilitated.

The second exposed surface of the second resin core may be dimensioned to entirely surround the inner end parts of the first terminals when viewed in the direction in which the base ends of the inner ends of the first terminals and the second exposed surface of the second resin core face each other. In this way, when the outer resin part is molded with the first resin core and the second resin core inserted, the second exposed surface of the second resin core can be held by the mold to entirely surround the inner end parts of the first terminals. Thus, resin for molding the outer resin part cannot intrude to the peripheries of the inner ends of the first terminals. As a result, even if the inner ends of the first terminals have a bent shape to face the connector case, the connector case can be molded easily.

The base ends of the inner end parts of the first terminals face the second exposed surface of the second resin core, and the second exposed surface of the second resin core is held by the mold. Thus, the first resin core need not be extended intentionally to a position facing the base ends of the inner end parts of all the first terminals. In this way, the second resin core including the second terminals can be utilized as a part to be held by the mold at a position facing the entire inner end parts of the first terminals. As a result, the used amount of a resin of the first resin core can be reduced and the shape of a part surrounding the inner end parts of the first terminals in the connector can be reduced in size.

Therefore, according to the second aspect of the invention, the connector case can be molded easily even if the inner ends of the first terminals have the bent shape to face the connector case composed of the first resin core, the second resin core and the outer resin part.

The invention also relates to a method for manufacturing a connector that has terminals, a resin core and an outer resin part. The resin core is configured to cover remaining parts of the terminals so that inner and outer end parts of the terminals project therefrom. The outer resin part is configured to cover a remaining part of the resin core with an exposed surface formed on a part of the resin core. The manufacturing method includes a primary molding process of molding the resin core by filling a primary resin material into a primary mold that has the terminals inserted therein, thereby forming the resin core with a projecting exposed surface and a parallel exposed surface. The inner end parts project from the projecting exposed surface. The parallel exposed surface is perpendicular to the projecting exposed surface and parallel to base ends of the inner end parts via a clearance between the base end parts and the parallel exposed surface. Bent tips of the inner end parts are arranged to project away from the parallel exposed surface. The method also includes a secondary molding process of arranging the resin core, including the terminals, in a secondary mold and holding the resin core with respect to the secondary mold. The method further includes preventing the intrusion of a secondary resin material for molding the outer resin part into the clearance between the inner end parts and the parallel exposed surface by causing an inner wall surface of the secondary mold to face the projecting exposed surface and the parallel exposed surface to entirely surround the inner end parts of the terminals when the secondary resin material is filled into the secondary mold.

The invention also relates to a second method for manufacturing a connector. The connector manufactured by the second method has first and second terminals, first and second resin cores and an outer resin part. The first resin core is configured to cover remaining parts of the first terminals so that inner and outer end parts of the first terminals project therefrom. The second resin core is configured to cover remaining parts of the second terminals so that inner and outer end parts of the second terminals project therefrom. The outer resin part is configured to cover a remaining part of the first resin core and a remaining part of the second resin core with a first exposed surface formed on a part of the first resin core. The inner end parts of the first terminals project from the first exposed surface, and a second exposed surface is formed on a part of the second resin core, perpendicular to the first exposed surface and adjacent to the first exposed surface exposed. The second manufacturing method includes a primary molding process of molding the first resin core by filling a primary resin material into a primary mold having the first terminals inserted therein and molding the second resin core by filling the primary resin material into a primary mold having the second terminals inserted therein. The method also includes a secondary molding process of: arranging the first resin core including the first terminals and the second resin core including the second terminals in a secondary mold; holding the first resin core and the second resin core with respect to the secondary mold; preventing a secondary resin material that molds the outer resin part from intruding into a clearance between base ends of the inner end parts of the first terminals and the second exposed surface by causing base ends of the inner end parts of the first terminals to face the second exposed surface via the clearance; arranging bent tips of the inner end parts of the first connector terminals to project away from the second exposed surface; and causing an inner wall surface of the secondary mold to face the first exposed surface and the second exposed surface to entirely surround the inner end parts of the first terminals by the secondary mold when the secondary resin material is filled into the secondary mold.

In accordance with the second method, when the resin core having the terminals arranged therein is molded in the primary molding process, the base ends of the inner end parts of the terminals are facing the parallel exposed surface of the core resin part via the clearance. Further, the bent tips of the inner end parts of the terminals project away from the parallel exposed surface.

The secondary molding process may be carried out so that the resin core, including the terminals, is arranged in the secondary mold and the inner wall surface of the secondary mold faces the projecting exposed surface and the parallel exposed surface of the resin core. At this time, the entire inner ends of the terminals are surrounded by the inner surface of the secondary mold. When the secondary resin for molding the outer resin part is filled into the secondary mold, the inner surface of the secondary mold faces the projecting exposed surface and the parallel exposed surface of the resin core. Thus, the resin core is held with respect to the secondary mold. During this filling, the inner wall surface of the secondary mold prevents intrusion of the secondary resin to the peripheries of the inner end parts of the terminals.

Therefore, the second manufacturing method enables the connector case to be molded easily even if the inner end parts of the terminals have the bent shape to face the connector case composed of the resin core and the outer resin part.

The first resin core having the first terminals therein and the second resin core having the second terminals therein may be molded in the primary molding process.

In the secondary molding process, the first and second resin cores are arranged in the secondary mold. At this time, the first and second resin cores are assembled, and the base end parts of the inner end parts of the first terminals face the second exposed surface of the second resin core via the clearance. Further, the bent tips of the inner end parts of the first connector terminals project away from the second exposed surface. Furthermore, the inner wall surface of the secondary mold faces the first exposed surface of the first resin core, and the second exposed surface of the second resin core and the inner end parts of the first terminals are surrounded by the mold.

When the secondary resin for molding the outer resin part is filled into the secondary mold, the inner surface of the secondary mold faces the first exposed surface of the first resin core and the second exposed surface of the second resin core. Thus, the first and second resin cores are held with respect to the secondary mold. Further, during this filling, the inner surface of the secondary mold prevents intrusion of the secondary resin material to the peripheries of the inner end parts of the first terminals.

Therefore, according to this manufacturing method, the connector case can be molded easily even if the inner end parts of the first terminals have the bent shape to face the connector case composed of the first resin core, the second resin core and the outer resin part.

Note that reference signs in parentheses of the respective constituent elements shown in one aspect of the invention correspond to reference signs in figures in embodiments, but the respective constituent elements are not limited only to the contents of the embodiments.

DETAILED DESCRIPTION

First Embodiment

Figure 1:
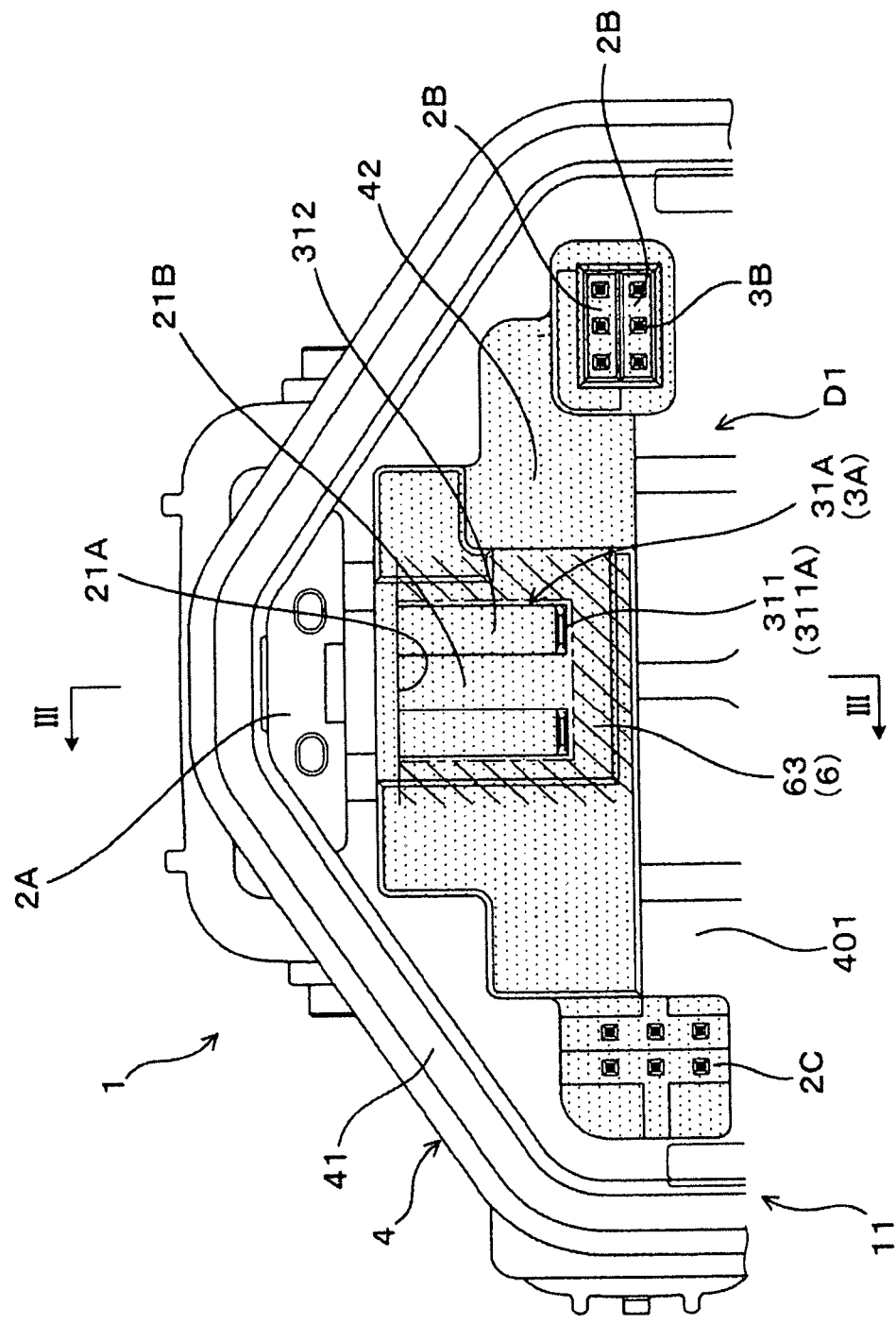
FIG. 1 is a plan view showing a state where a connector according to a first embodiment is viewed from an inner side in a mounting direction.
Figure 2:
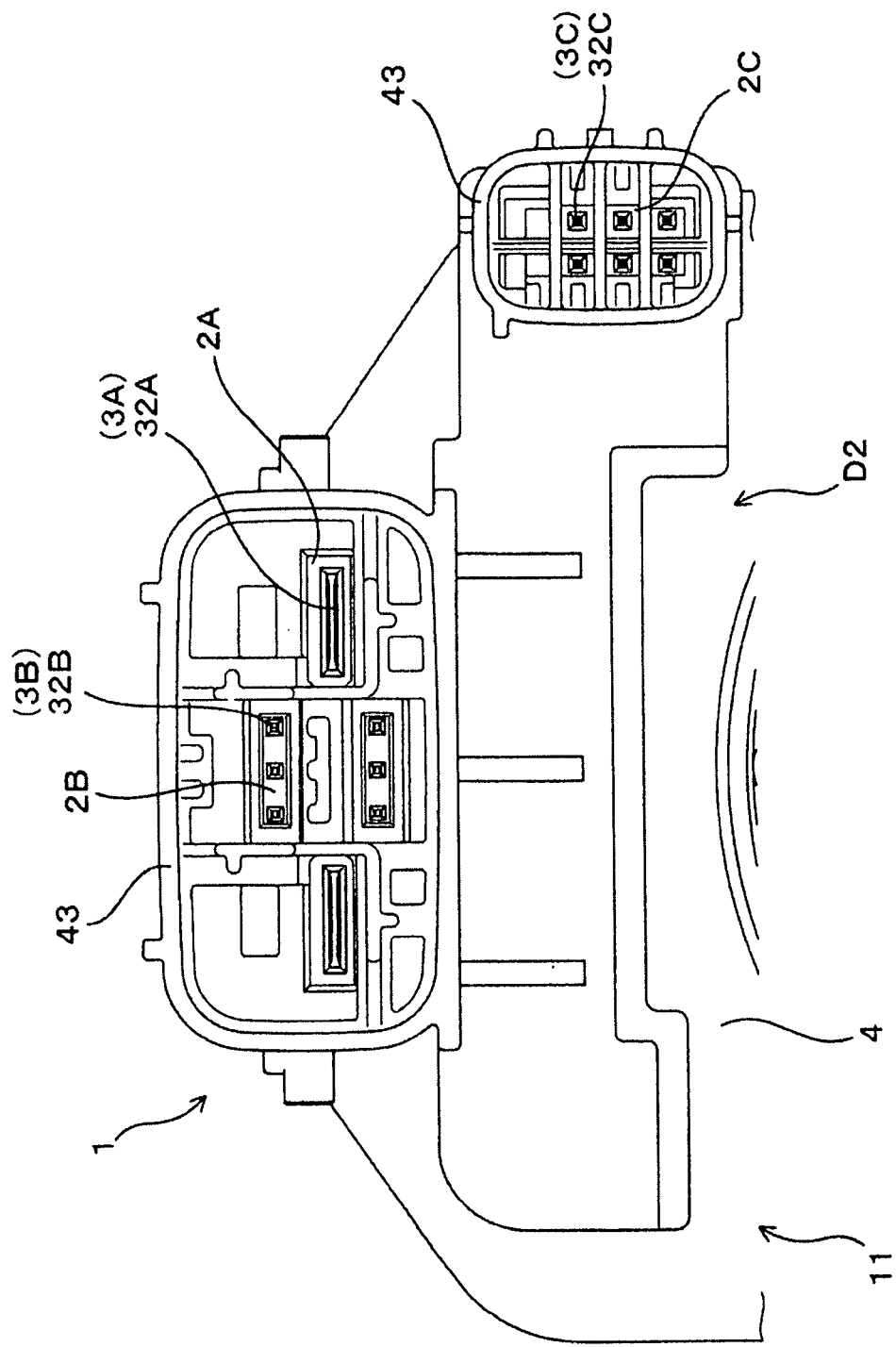
FIG. 2 is a plan view showing a state where the connector of the first embodiment is viewed from an outer side in the mounting direction.
Figure 3:
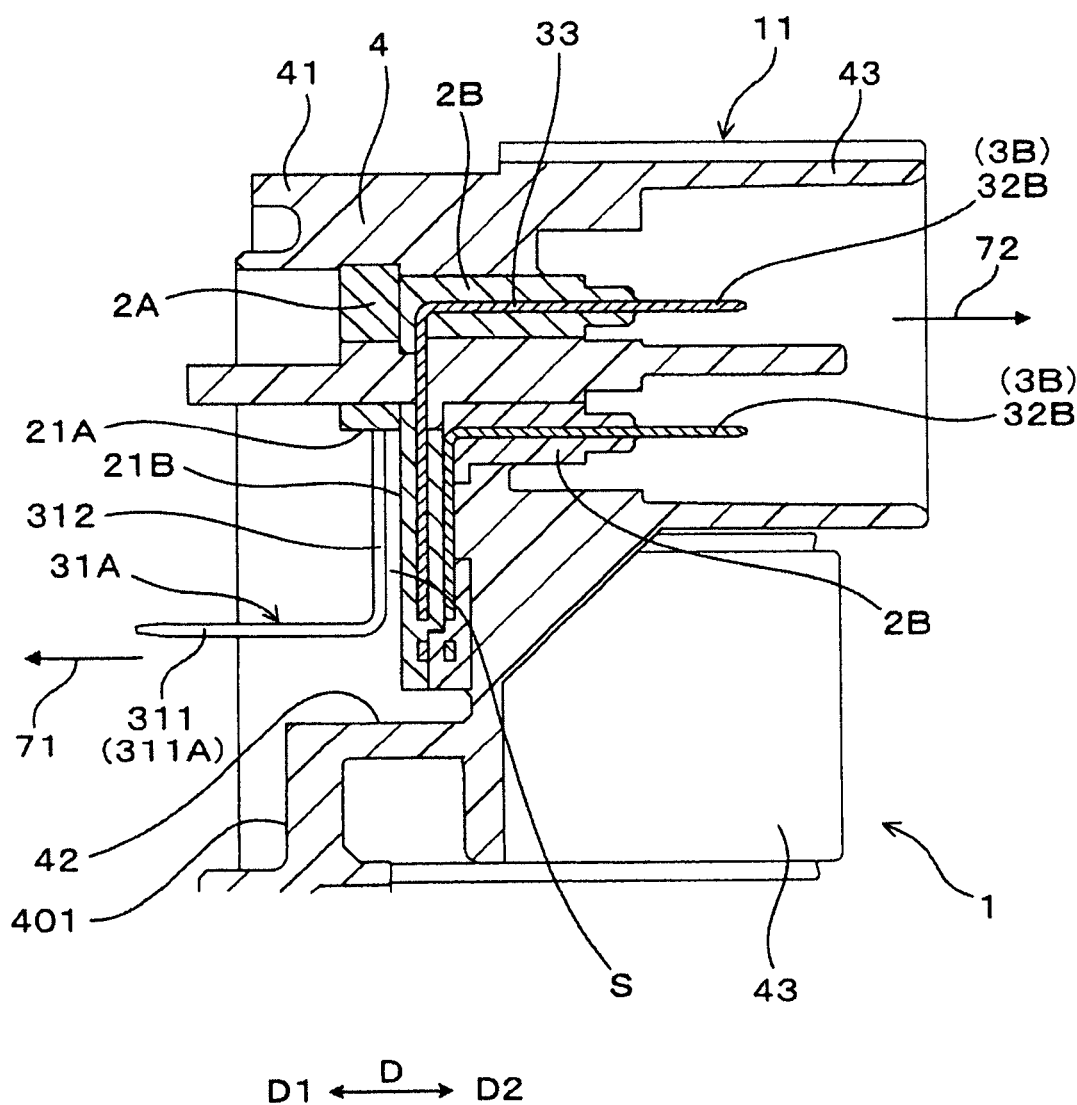
FIG. 3 is a section along III-III of FIG. 1.

As shown in FIGS. 1 to 3, a connector 1 of this embodiment includes first terminals 3A, a first resin core 2A, second terminals 3B, second resin cores 2B and an outer resin part 4. Inner end parts 31A and outer end parts 32A of the first terminals 3A project from the first resin core 2A and the first resin core 2A covers remaining parts of the first terminals 3A. Inner end parts 31B and outer end parts 32B of the second terminals 3B project from the second resin cores 2B, and the second resin cores 2B cover remaining parts of the second terminals 3B. The outer resin part 4 covers a remaining part of the first resin core 2A and remaining parts of the second resin cores 2B. However, a first exposed surface 21A is exposed on a part of the first resin core 2A, and a second exposed surface 21B is exposed on a part of the second resin core 2B.

As shown in FIG. 3, a base end 312 of the inner end part 31A of the first terminal 3A faces the second exposed surface 21B of the second resin core 2B with a clearance S formed between the second exposed surface 21B and the base end 312. A tip 311 of the inner end part 31A of the first terminal 3A has a bent tip 311A bent away from the second exposed surface 21B. When viewed in a mounting direction D in which the inner end parts 31A of the first terminals 3A and the second exposed surface 21B face each other, the second exposed surface 21B has a size to entirely surround the inner end parts 31A of the first terminals 3A.

(Connector 1)

As shown in FIG. 3, the connector 1 of this embodiment is used in electrical wiring in an electric power steering device as an electronic control unit of an automotive vehicle. Each connector terminal 3A, 3B in the connector 1 is used as a wiring connecting portion for wiring a control board 71 electrically connected to electronic control units such as a motor used in electric power steering and various sensors and a control device of the automotive vehicle. The inner end parts 31A of the plurality of first terminals 3A and the inner end parts 31B of the second terminals 3B project inwardly of the connector 1 and are connected to the electric power steering device. Further, the outer end parts 32A of the first terminals 3A and the outer end parts 32B of the second connector terminals 3B project toward an outer side D2 opposite to an inner side D1 of a case of the electric power steering device and is connected to a mating connector 72.

The connector 1 with the terminals 3A, 3B forms a male connector, and the mating connector 72 forms a female connector to be connected to the connector 1. An outer resin part 4 of the connector 1 forms a cover to be mounted on the case of the electric power steering device. Although not shown, the outer resin part 4 includes an annular part to be arranged around an end part of the motor of the electric power steering device. Note that the connector 1 can be used for various electronic control components other than the electric power steering device.

A connector case 11 of the connector 1 of this embodiment is composed of the resin cores 2A, 2B and the outer resin part 4. The connector case 11 is formed by insert-molding the outer resin part 4 with the resin cores 2A, 2B arranged inside. A resin material constituting the resin cores 2A, 2B and a resin material constituting the outer resin part 4 are thermoplastic resins of the same type. Note that the type of the resin material constituting the resin cores 2A, 2B and the type of the resin material constituting the outer resin part 4 may differ from each other.

Figure 4:
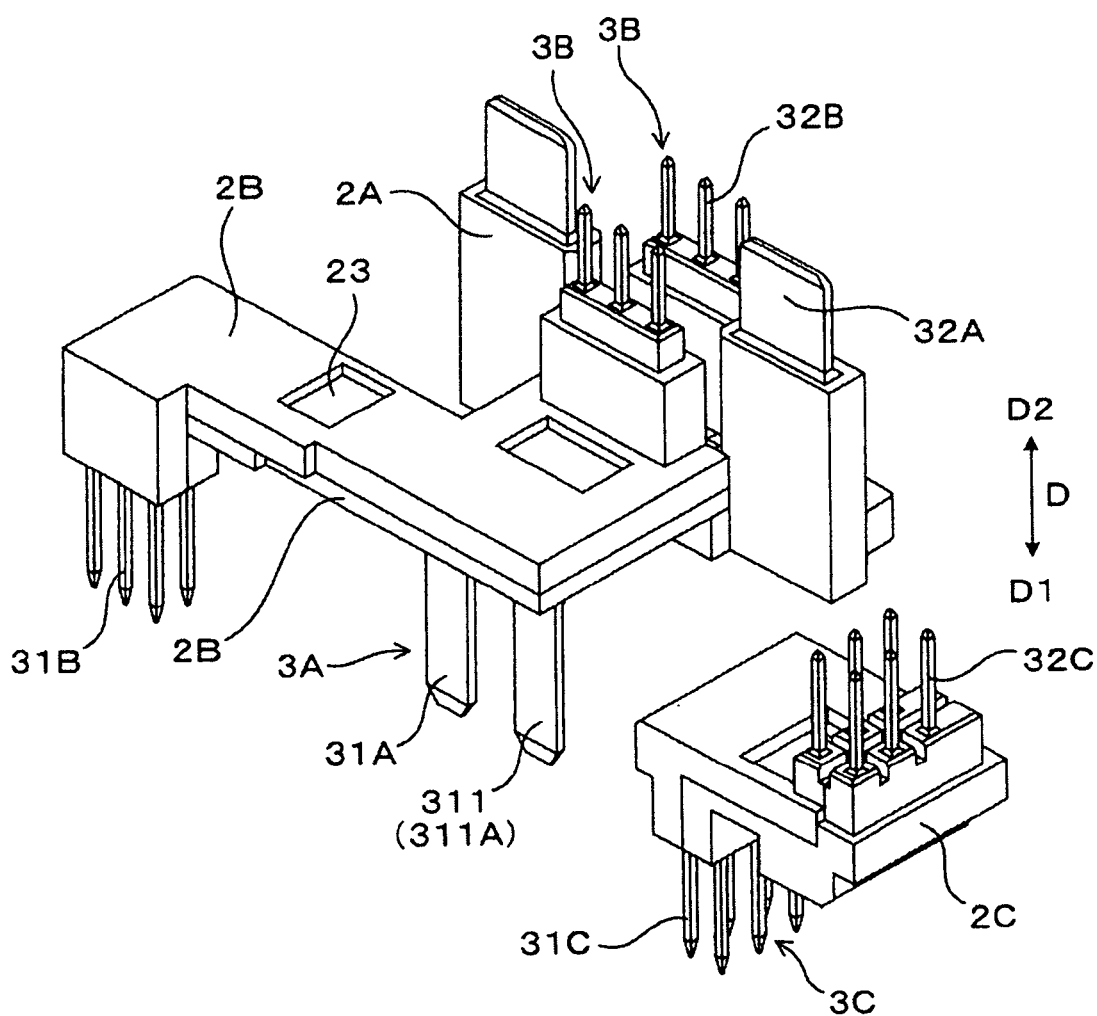
FIG. 4 is a perspective view showing resin cores according to the first embodiment.

As shown in FIGS. 3 and 4, an end of the connector 1 where the control board 71 is mounted is referred to as the inner side D1 and an end that is opposite to the inner side D1 and where the mating connector 72 is mounted is referred to as the outer side D2. The inner side D1 and the outer side D2 are arranged along a mounting direction D. The inner end parts 31A, 31B of the terminals 3A, 3B are arranged on the inner side D1 of the connector 1, and the outer end parts 32A, 32B of the terminals 3A, 3B are arranged on the outer side D2 of the connector 1. A mounting portion into which the mating connector 72 is mounted is formed by a tubular portion 43 including the outer end parts 32A, 32B of the terminals 3A and 3B and the outer resin part 4 surrounding the outer end parts 32A, 32B.

(Resin Cores 2A, 2B, 2C and Terminals 3A, 3B, 3C)

FIGS. 4 to 7 show a plurality of resin cores 2A, 2B and 2C excluding the outer resin part 4 in the connector 1. As shown in FIGS. 4 to 7, the first terminal 3A of this embodiment constitutes a busbar for power supply used in the motor of the electric power steering device or the like. The first terminal 3A is formed by bending a plate having a rectangular cross-section in a plate thickness direction. The inner end part 31A of the first terminal 3A projecting from the first resin core 2A is composed of a bent tip part 311A serving as a tip 311 parallel to the mounting direction D and a base end 312 perpendicular to the mounting direction D and parallel to the second exposed surface 21B.

In the first terminal 3A, the bent tip part 311A and the outer end 32A are parallel to the mounting direction D. The first terminal 3A is shaped such that the bent tip part 311A and the outer end part 32A are linked by a part perpendicular to the mounting direction D. The bent tip part 311A and the base end 312 constituting the inner end part 31A of the first terminal 3A are arranged outside the first resin core 2A and the outer resin part 4, and the inner end part 31A can be deflected, utilizing an L shape formed by the bent tip part 311A and the base end 312.

As shown in FIG. 4, the second connector terminals 3B constitute control terminals used in various sensors of the electric power steering device. The second connector terminals 3B are arranged at appropriate intervals in parallel to each other, and a predetermined number of terminal pairs are arranged in two rows in an overlapping manner. There are two separate second resin cores 2B to facilitate the molding of the connector 1 including the second terminals 3B arranged in two rows in an overlapping manner.

Note that, in the connector 1, the other resin cores 2C and other terminals 3C also are arranged in two rows in an overlapping manner. The second terminals 3B and the other terminals 3C also are shaped such that the inner end parts 31B, 31C and the outer end parts 32B, 32C are parallel to the mounting direction D and are linked by parts perpendicular to the mounting direction D.

Each resin core 2A, 2B, 2C is insert-molded with the terminals 3A, 3B, 3C arranged inside before the outer resin part 4 of the connector 1 is molded. Each resin core 2A, 2B, 2C is used to fix a state of arrangement of the terminals 3A, 3B, 3C. By using each resin core 2A, 2B, 2C, the connector 1 in which the terminals 3A, 3B, 3C are arranged in rows in an overlapping manner can be manufactured easily.

As shown in FIG. 4, the first terminals 3A, the second terminals 3B and the other terminals 3C are male terminals including the inner end parts 31A, 31B and 31C and the outer end parts 32A, 32B and 32C projecting from the respective resin cores 2A, 2B, 2C.

Most of a remaining part of the first terminal 3A excluding the inner end part 31A and the outer end part 32A is embedded as an intermediate part 33 in the first resin core 2A. However, part of the intermediate part 33 of the first terminal 3A may be exposed from the first resin core 2A by a hole 23 formed in the first resin core 2A. Further, the first terminals 3A are arranged in a primary mold while being linked to each other by a carrier (not shown) during press-working so as to be positioned easily during the molding of the first resin core 2A. The first resin core 2A is formed with the hole 23 for exposing the carrier linking the first terminals 3A to each other. The carrier is cut off after the molding of the first resin core 2A, and the resin for molding the outer resin part 4 is filled into the hole 23.

For the second terminals 3B and the other terminals 3C, the configurations of the intermediate parts 33, holes 23 and carriers are the same as those of the first terminals 3A.

As shown in FIGS. 3 and 4, the first resin core 2A and the two second resin cores 2B are arranged in the outer resin part 4 while being assembled with each other. The first exposed surface 21A of the first resin core 2A is formed as an end surface from which the inner end parts 31A of the first terminals 3A project. The first exposed surface 21A is formed in parallel to the mounting direction D. The second exposed surface 21B of each second resin core 2B is formed as a surface of the second resin core 2B on the inner side D1 in the mounting direction D where the intermediate parts 33 of two second terminals 3B are arranged. With the first resin core 2A and the two second resin cores 2B assembled, the second exposed surface 21B is perpendicular to the first exposed surface 21A. Three or more second resin cores 2B may be assembled in an overlapping manner.

As shown in FIGS. 1 and 4, when the inner end parts 31A of the first terminals 3A are viewed from the inner side D1 in the mounting direction D in the connector 1, the second exposed surface 21B exposed from the outer resin part 4 has an area larger than the total area of the inner end parts 31A of the first terminals 3A. When viewed from the inner side D1 in the mounting direction D, the second exposed surface 21B entirely surrounds the first terminals 3A on both sides in an arrangement direction of the inner end parts 31A of the first terminals 3A and from three directions other than a direction in which the first exposed surface 21A is located. When viewed from the inner side D1 in the mounting direction D, the entire inner end parts 31A of the first terminals 3A are surrounded by edges of the first exposed surface 21A on both sides in the arrangement direction of the first terminals 3A and three direction edges of the second exposed surface 21B.

Figure 5:
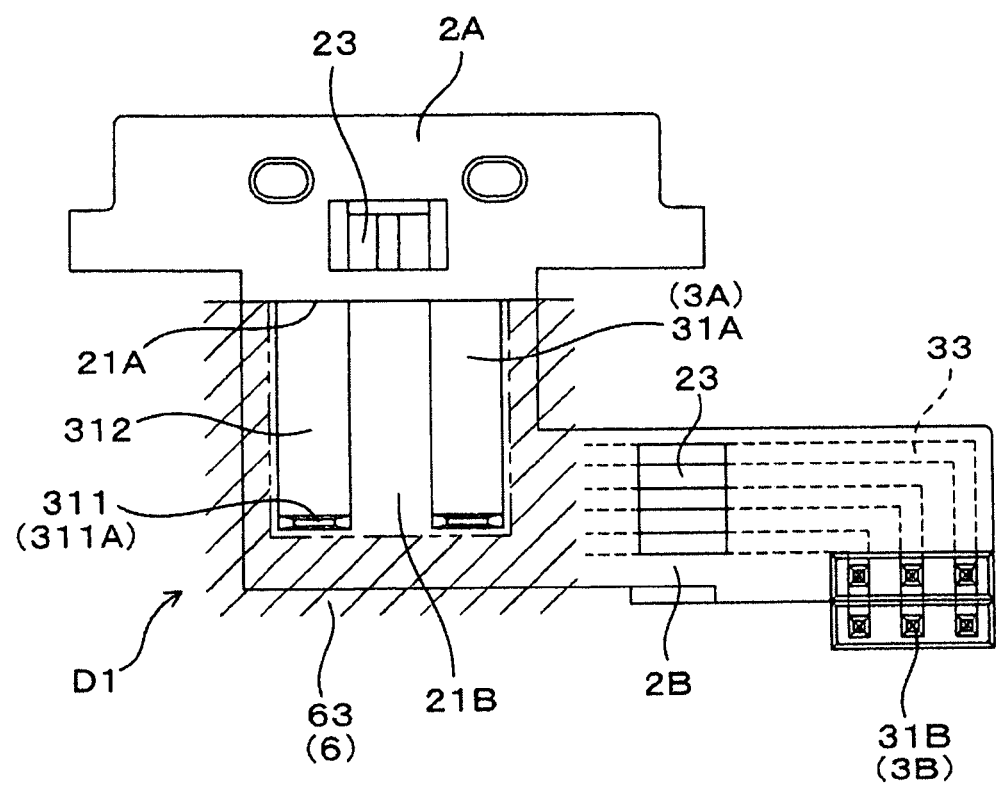
FIG. 5 is a plan view showing a state where the resin cores according to the first embodiment are viewed from the inner side in the mounting direction.
Figure 6:
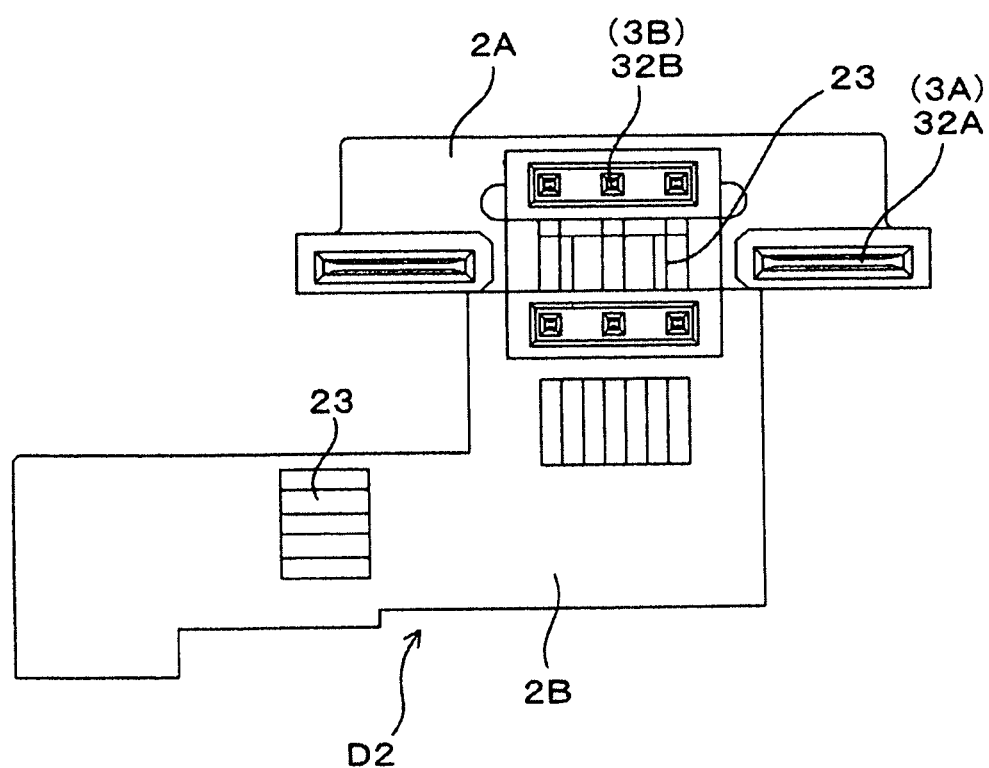
FIG. 6 is a plan view showing a state where the resin cores according to the first embodiment are viewed from the outer side in the mounting direction.
Figure 7:
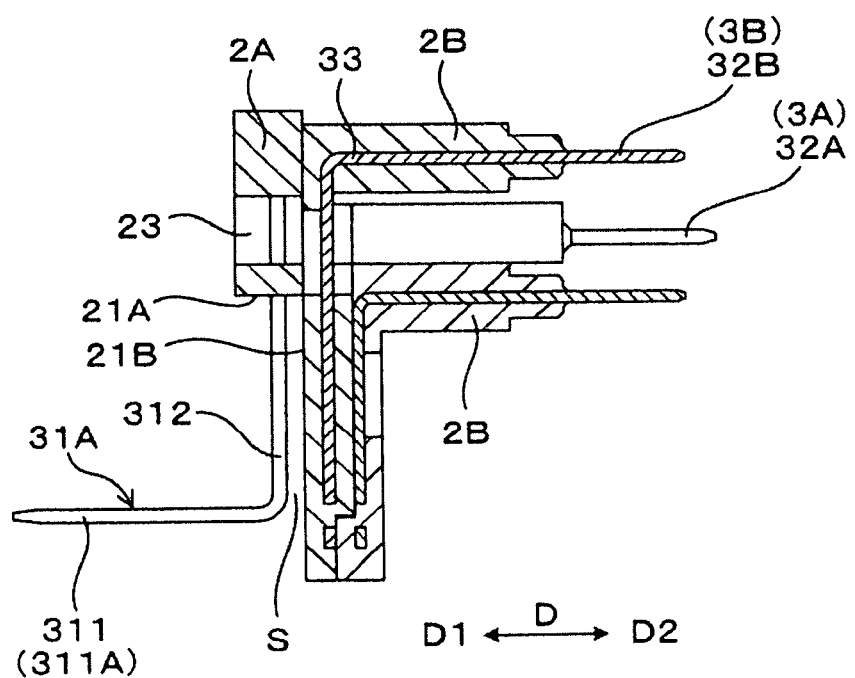
FIG. 7 is a cross-section along III-III of FIG. 1, showing the resin cores.

In FIGS. 1 and 5, a core holding portion 63 of a secondary mold 6 arranged around the first terminals 3A is shown by oblique hatching. An inner wall surface of the core holding portion 63 of the secondary mold 6 for molding the outer resin part 4 continuously faces the edges of the first exposed surface 21A on both sides in the arrangement direction of the first connector terminals 3A and the three direction edges of the second exposed surface 21B during the molding of the outer resin part 4. In this way, when the outer resin part 4 is molded, the entire inner end parts 31A of the first terminals 3A are surrounded by the inner wall surface of the core holding portion 63 of the secondary mold 6 to prevent leakage of the resin material for molding the outer resin part 4 to the inner end parts 31A.

(Outer Resin Part 4)

As shown in FIGS. 1 to 3, the outer resin part 4 forms a part of the connector case 11 other than the respective resin cores 2A, 2B and 2C, and is a resin part forming the outer shape of the connector case 11. In the connector 1, the respective resin cores 2A, 2B and 2C and the outer resin part 4 are integrated and it is difficult to distinguish the respective resin cores 2A, 2B and 2C and the outer resin part 4 from the outside of the connector 1.

However, when the connector 1 is cut, a boundary position between the respective resin cores 2A, 2B and 2C and the outer resin part 4 can be confirmed. Resin surface layers when the respective resin cores 2A, 2B and 2C are molded are arranged at this boundary. These surface layers often have properties different from those of other parts such as a high hardness, and thus the arrangement of the respective resin cores 2A, 2B and 2C in the connector case 11 can be confirmed.

As shown in FIGS. 1 and 3, an inner side wall 41 projecting toward the inner side D1 is formed on an edge on the inner side D1 in the mounting direction D of the outer resin part 4 forming the cover of the electric power steering device. The inner side wall 41 is a part to be mounted on the case of the electric power steering device via a sealing member or the like. An inner side surface 401 of the outer resin part 4 mostly is recessed toward the outer side D2 from the inner side wall 41.

The second exposed surface 21B of the second resin core 2B forms a bottom surface of a recess 42 recessed toward the outer side D2 in the mounting direction D from the inner side surface 401 of the outer resin part 4. In FIG. 1, the bottom surface of the recess 42 is shown by dotted hatching. If an attempt is made to integrally mold a part constituting the second exposed surface 21B of the second resin core 2B to the outer resin part 4 in the secondary mold 6 for the outer resin part 4, an undercut shape during resin molding by the secondary mold 6 is formed by the inner end parts 31A of the first terminals 3A. Particularly, if the second exposed surface 21B of the second resin core 2B is arranged in the recess 42 of the outer resin part 4, it is difficult to arrange a slide core slidable relative to any one of mold parts 61, 62 of the secondary mold 6 in the recess 42. However, a slide core is not needed at a location where the second exposed surface 21B is to be molded, in the secondary mold 6 by forming the second exposed surface 21B on the second resin cores 2B.

The expression "undercut shape" refers to the shape of a part where a resin molded article and a mold interfere when the resin molded article after molding is taken out from the mold, i.e. the shape of a part that is difficult to take out from the mold unless a slide core is provided in the mold. In this embodiment, the base ends 312 of the inner end parts 31A of the first terminals 3A form an undercut shape. A resin molded article with an undercut shape can be taken out by arranging the slide core in the mold.

(Secondary Mold 6)

Figure 8:
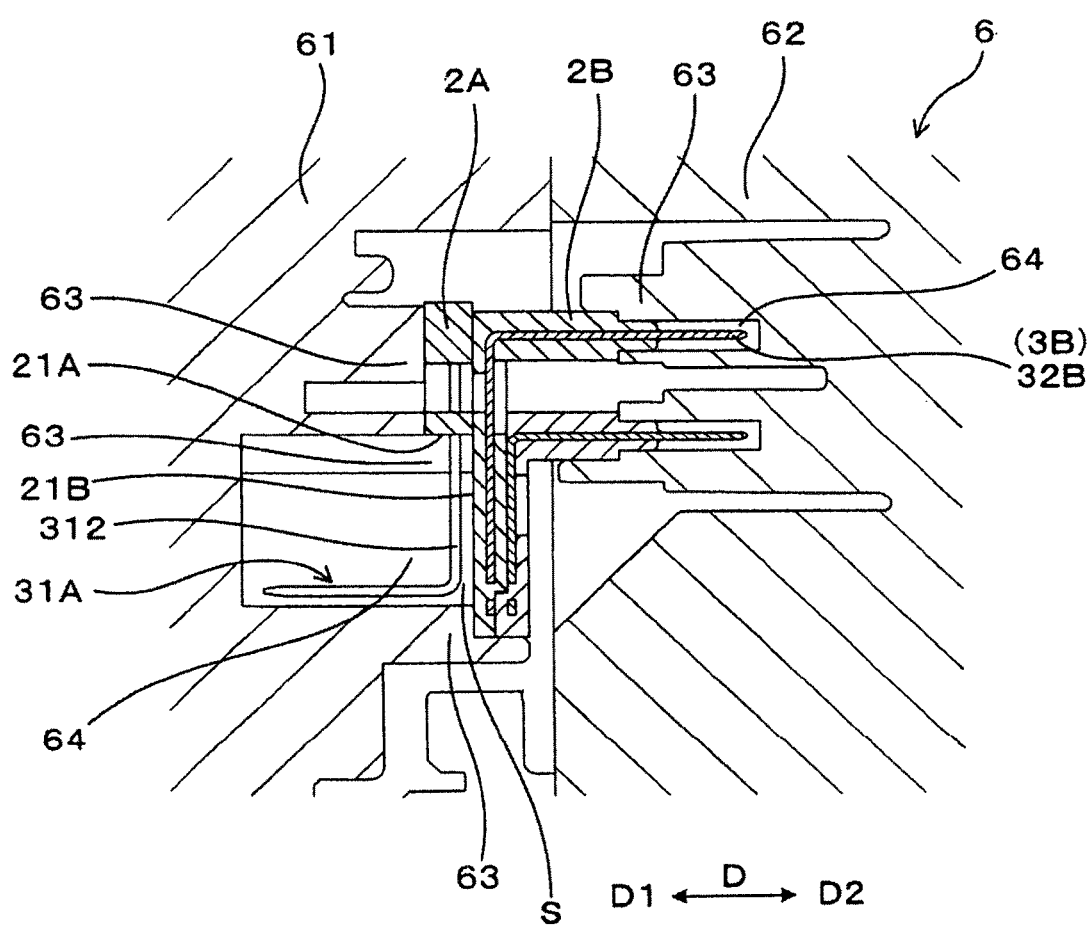
FIG. 8 is a cross-section along III-III of FIG. 1, showing a state where the resin core according to the first embodiment are arranged in a secondary mold.
Figure 9:
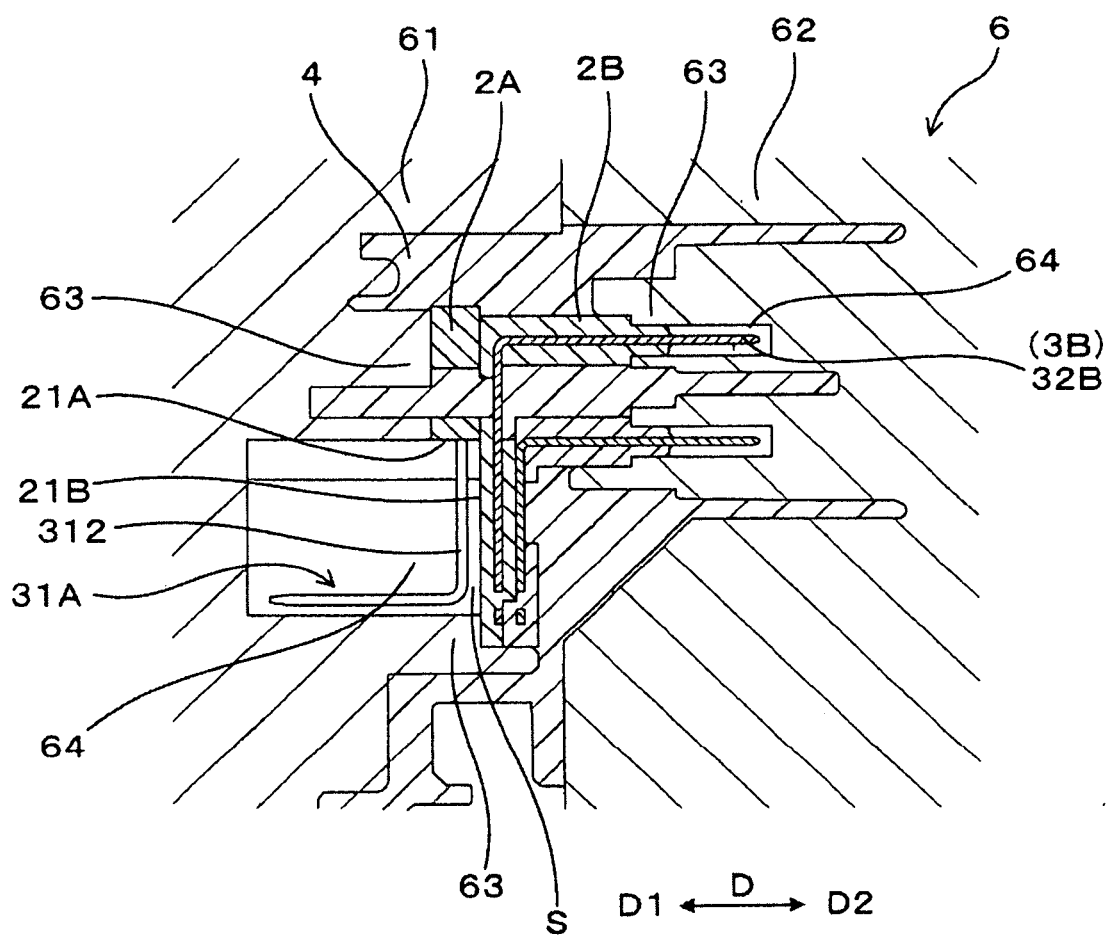
FIG. 9 is a cross-section along III-III of FIG. 1, showing a state where an outer resin part is molded in the secondary mold.

The outer resin part 4 of the connector 1 is molded by injection molding. Injection molding uses an injection molding machine, as shown in FIGS. 8 and 9, with an injection cylinder or the like for injecting a resin material in a molten state and the secondary mold 6 into which the molten resin from the injection cylinder is injected. The secondary mold 6 is formed of two mold parts 61, 62 to enable a resin molded article after molding to be taken out. Note that a slide core for enabling the connector 1 after molding to be taken out can be provided in either one of the mold parts 61, 62.

As shown in FIGS. 8 and 9, the first resin core 2A, the two second resin cores 2B, the other resin cores 2C and the like are arranged in the secondary mold 6 when molding the outer resin part 4. When insert molding is performed using the resin material for the outer resin part 4, the first resin core 2A, the two second resin cores 2B, the other resin cores 2C and the like are embedded in the outer resin part 4.

Further, core holding portions 63 are formed on inner wall surfaces of the mold parts 61, 62 for holding and positioning the resin cores 2A, 2B and 2C with respect to the mold parts 61, 62. Thus, the resin cores 2A, 2B and 2C are held in position in the secondary mold 6 when the outer resin part 4 is molded.

Parts of the resin cores 2A, 2B and 2C held by the core holding portions 63 form exposed surfaces on the surface of the outer resin part 4. Any one of the core holding portions 63 in one mold part 61 of the secondary mold 6 holds the first exposed surface 21A of the first resin core 2A and the second exposed surface 21B of the second resin cores 2B.

An escaping recess 64 for preventing the interference of the inner end parts 31A of the first terminals 3A is formed around the core holding portion 63 of the secondary mold 6 for holding the first exposed surface 21A and the second exposed surface 21B. Further, escaping recesses 64 for preventing the interference of the inner end parts 31B and 31C or the outer end parts 32A, 32B and 32C are formed in the secondary mold 6.

(Manufacturing Method of Connector 1)

The connector 1 of this embodiment is manufactured by performing injection molding in two stages in a primary molding process and a secondary molding process. In the primary molding process, the first resin core 2A is molded by filling a primary resin material into a primary mold having the first terminals 3A inserted therein. Further, in the primary molding process, the second resin cores 2B are molded by filling the primary resin material into primary molds having the second terminals 3B inserted therein. Further, in the primary molding process, the other resin cores 2C are molded by filling the primary resin material into primary molds having the other terminals 3C inserted therein.

As shown in FIG. 4, after the primary molding process is performed, the intermediate parts 33 of the first terminals 3A are embedded in the first core resin part 2A, the inner end parts 31A of the first terminals 3A project from one end of the first resin core 2A and the outer end parts 32A of the first connectors 3A project from the other end part of the first resin core 2A. Further, the intermediate parts 33 of the second terminals 3B are embedded in the second resin cores 2B, the inner end parts 31B of the second terminals 3B project from one end part of the second resin cores 2B and the outer end parts 32B of the second terminals 3B project from the other ends of the second resin cores 2B.

As shown in FIG. 8, in the secondary molding process, the first resin core 2A, the two second resin cores 2B, the other resin cores 2C and the like are arranged in the secondary mold 6 and sandwiched by the core holding portions 63 of the mold parts 61, 62 of the secondary mold 6. At this time, the first resin cores 2A and the two second resin cores 2B are assembled, and the base ends 312 of the inner end parts 31A of the first terminals 3A face the second exposed surface 21B of the second resin cores 2B via the clearance S. Further, the bent tip parts 311A of the inner ends 31A of the first terminals 3A are bent away from the second exposed surface 21B. Furthermore, the inner wall surface of the core holding portion 63 of the secondary mold 6 faces both the first exposed surface 21A of the first resin core 2A and the second exposed surfaces 21B of the second resin cores 2B, and the inner ends 31A of the first terminals 3A are surrounded entirely by the core holding portion 63.

When a secondary resin material for molding the outer resin part 4 is filled into the secondary mold 6, the inner wall surfaces of the core holding portions 63 face the first exposed surface 21A, the second exposed surface 21B and other exposed surfaces to hold the first resin core 2A, the two second resin cores 2B and the other resin cores 2C with respect to the secondary mold 6. Further, during this filling, the core holding portion 63 prevent intrusion of the secondary resin material to the peripheries of the inner end parts 31A of the first terminals 3A.

In this way, in the secondary mold 6, the outer resin part 4 is molded of the secondary resin material and the connector 1 having the first resin core 2A, the two second resin cores 2B, the other resin cores 2C and the like built therein is molded. Thereafter, the mold parts 61, 62 are separated and the connector 1 is taken out from the secondary mold 6.

(Functions and Effects)

The connector 1 of this embodiment is configured such that even though the base ends 312 of the inner end parts 31A of the first terminals 3A are arranged to face the connector case 11 composed of the first resin cores 2A, the two second resin cores 2B, the other resin cores 2C and the outer resin part 4, the base ends 312 of the inner end parts 31A of the first connector terminals 3A do not form an undercut shape during resin molding. Specifically, by separately molding the first resin core 2A having the first terminals 3A arranged therein and the two second resin cores 2B having the second terminals 3B arranged therein from the outer resin part 4, the base ends 312 of the inner end parts 31A of the first connector terminals 3A can face the second exposed surface 21B of the second resin core 2B without forming the undercut shape when the outer resin part 4 is molded. In this way, the structure of the secondary mold 6 for molding the outer resin part 4 can be simplified.

Further, the inner end part 31A of the first terminal 3A is composed of the base end 312 parallel to the second exposed surface 21B and the bent tip 311A bent with respect to the base end 312 in the direction away from the second exposed surface 21B. In this way, when the bent tip 311A of the inner end 31A of the first connector terminal 3A is inserted into the control board 71, this inner end part 31A can be deflected resiliently to deform at least one of the base end 312 and a boundary part between the base end 312 and the bent tip 311A. Thus, the insertion of the bent tip 311A of the inner end 31A of the first terminal 3A into the control board 71 can be facilitated.

Further, when viewed from the inner side D1 in the mounting direction D where the base ends 312 of the inner end parts 31A of the first terminals 3A and the second exposed surface 21B of the second resin cores 2B face each other, the first exposed surface 21A of the first resin core 2A and the second exposed surfaces 21B of the second resin cores 2B are dimensioned to entirely surround the inner end parts 31A of the first terminals 3A. In this way, when the outer resin part 4 is molded with the first resin core 2A and the second resin cores 2B inserted, the first exposed surface 21A of the first resin core 2A and the second exposed surface 21B of the second resin cores 2B can be held as to entirely surround the inner end parts 31A of the first terminals 3A by the inner wall surface of the core holding portion 63 of the secondary mold 6. Thus, the secondary resin material for molding the outer resin part 4 cannot intrude to the peripheries of the inner end parts 31A of the first terminals 3A. As a result, even if the inner end parts 31A of the first terminals 3A have a bent shape to face the connector case 11, the connector case 11 can be molded easily.

Further, the base ends 312 of the inner end parts 31A of the first terminals 3A face the second exposed surfaces 21B of the second resin cores 2B and the second exposed surfaces 21B of the second core resin cores 2B are held by the inner surface of the core holding portion 63 of the secondary mold 6. Thus, the first resin core 2A need not be extended intentionally to a position facing the base ends 312 of the entire inner end parts 31A of the first terminals 3A. In this way, the second resin cores 2B and the second terminals 3B can be utilized as a part to be held by the secondary mold 6 at the position facing the entire inner ends 31A of the first terminals 3A. As a result, the used amount of the primary resin material of the first resin core 2A can be reduced and the shape of a part surrounding the inner end parts 31A of the first connector terminals 3A can be smaller.

Therefore, according to the connector 1 of this embodiment and the manufacturing method thereof, even if the inner end parts 31A of the first connector terminals 3A have the bent shape to face the connector case 11 composed of the first resin cores 2A, the second resin cores 2B, the other resin cores 2C and the outer resin part 4, the connector case 11 can be molded easily.

Second Embodiment

Figure 10:
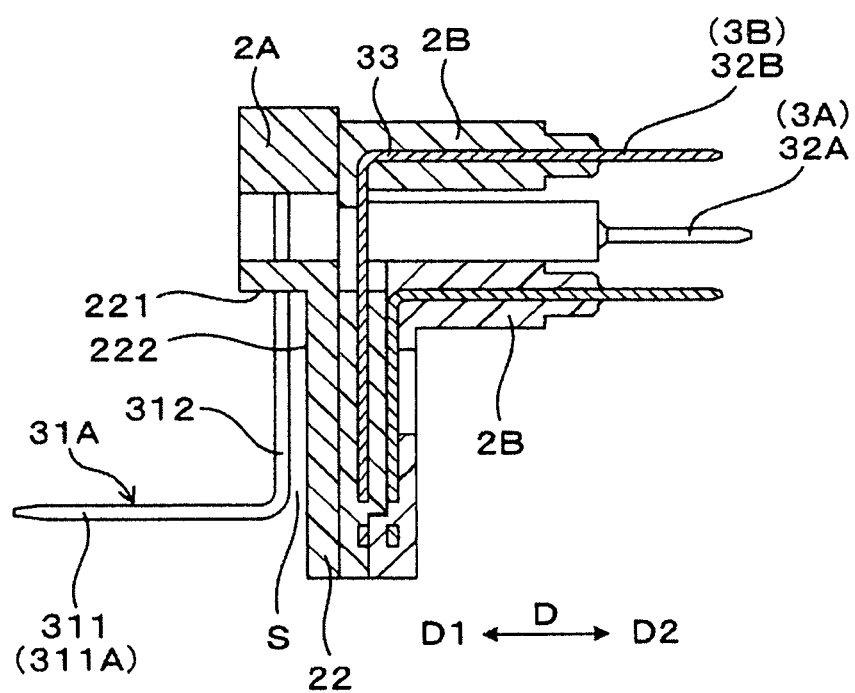
FIG. 10 is a view, corresponding to the cross-section along III-III of FIG. 1, showing core resin parts according to a second embodiment.

As shown in FIG. 10, inner end parts 31A of first terminals 3A in a first resin core 2A are arranged to face a facing portion 22 of the first core resin part 2A in a connector of this embodiment. In FIG. 10, an outer resin part 4 is not shown. The connector 1 of this embodiment also includes the first resin core 2A having the first terminals 3A arranged therein, two second resin cores 2B having second terminals 3B arranged therein and the outer resin part 4 as in the first embodiment. The outer resin part 4 covers the first resin core 2A, the second resin cores 2B and the like with exposed surfaces 221, 222 formed on a part of the first resin cores 2A exposed.

The exposed surfaces 221, 222 of the first resin core 2A include a projecting exposed surface 221 from which the inner end parts 31A of the first terminals 3A project, and a parallel exposed surface 222 that is arranged perpendicular to the projecting exposed surface 221 and in parallel to base end parts 312 of the inner ends 31A of the first terminals 3A with a clearance S formed between the base end parts 312 and the parallel exposed surface 222. The first core resin part 2A is formed with the facing portion 22 facing the inner end parts 31A of the first terminals 3A via the clearance S and arranged to overlap the second resin cores 2B. The parallel exposed surface 222 is formed as a surface of the facing portion 22.

A tip 311 of the inner end part 31A of the first terminal 3A is formed with a bent tip 311A bent away from the parallel exposed surface 222. When viewed in a mounting direction D in which the base ends 312 of the inner end parts 31A of the first terminals 3A and the parallel exposed surface 222 of the facing portion 22 of the first resin cores 2A are facing each other, the parallel exposed surface 222 of the facing portion 22 of the first resin cores 2A has such a size as to entirely surround the inner ends 31A of the first terminals 3A.

The connector 1 of this embodiment is obtained by forming the facing portion 22 at a position facing the first terminals 3A in the connector 1 of the first embodiment, and the configurations of the other parts are the same as in the first embodiment. Note that the connector 1 may not include the second resin cores 2B and the first resin core 2A may be formed as a core resin part having terminals arranged therein. The configuration of the resin core in this case is similar to that of the first resin core 2A.

When the first resin core 2A is molded by a primary resin material in a primary molding process of a manufacturing method of the connector 1 of this embodiment, the projecting exposed surface 221 and the parallel exposed surface 222 are formed on the facing portion 22 of the first resin core 2A. Further, the bent tips 311A of the inner end parts 31A of the first terminals 3A are bent away from the parallel exposed surface 22.

Figure 11:
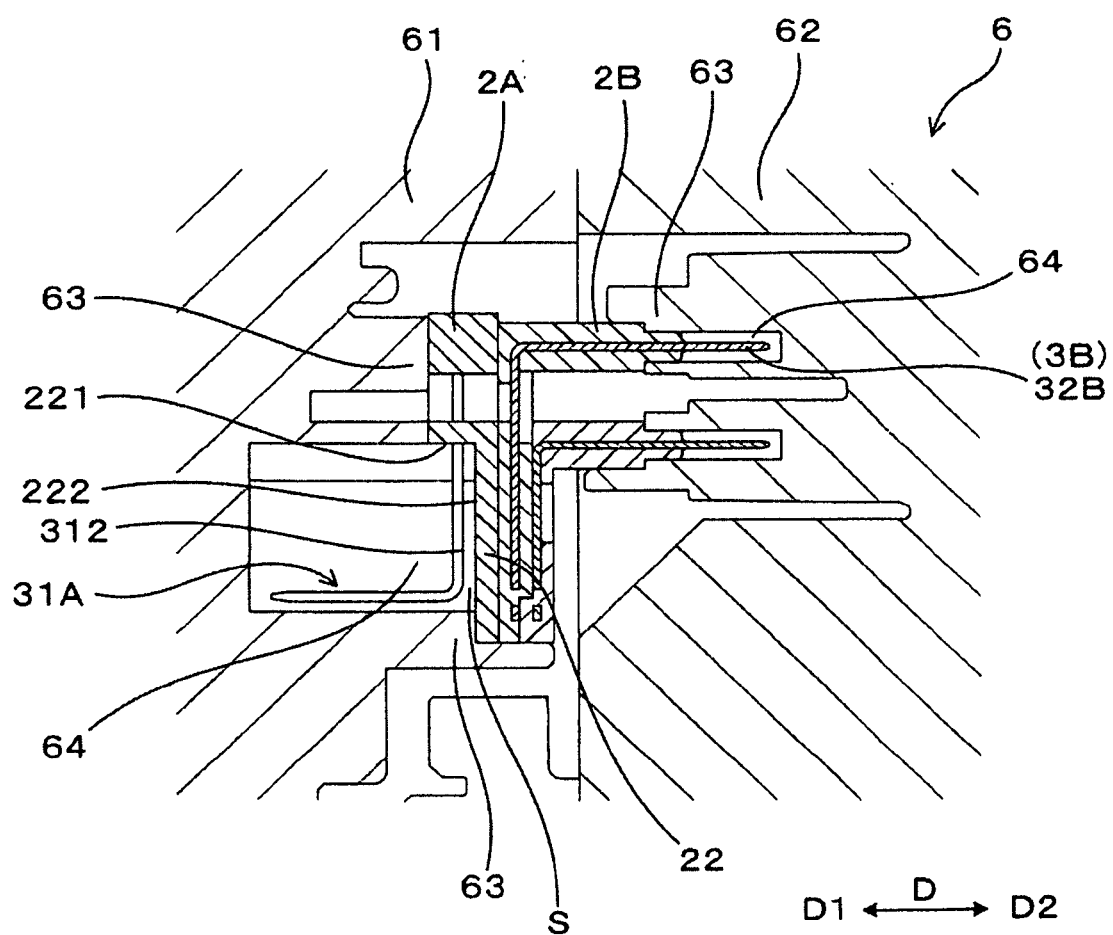
FIG. 11 is a view, corresponding to the cross-section along III-III of FIG. 1, showing a state where the resin cores of the second embodiment are arranged in a secondary mold.

When the outer resin part 4 is molded of a secondary resin, as shown in FIG. 11. in a secondary molding process of the manufacturing method of the connector 1 of this embodiment, an inner surface of a core holding portion 63 of a secondary mold 6 faces the projecting exposed surface 221 and the parallel exposed surface 222 of the resin core 2A, and the inner end parts 31A of the first terminals 3A are surrounded entirely by this core holding portion 63. The first resin core 2A and the two second resin cores 2B are held with respect to the secondary mold 6 by core holding portions 63 in mold parts 61, 62 of the secondary mold 6. Further, by entirely surrounding the inner ends 31A of the first terminals 3A by the core holding portion 63, the secondary resin cannot intrude into the clearance S between the inner end parts 31A of the first terminals 3A and the parallel exposed surface 222.

(Functions and Effects)

The connector 1 of this embodiment can be molded without the base ends 312 of the inner end parts 31A of the first terminals 3 forming an undercut shape and with the base ends 312 of the inner end parts 31A of the first connector terminals 3A facing the parallel exposed surface 222 of the first resin core 2A when the outer resin part 4 is molded by separately forming the first resin core 2A having the first terminals 3A arranged therein from the outer resin part 4. In this way, the structure of the secondary mold 6 for molding the outer resin part 4 can be simplified.

Further, the inner end part 31A of the first terminal 3A is composed of the base end 312 parallel to the parallel exposed surface 222 and the bent tip 311A bent with respect to the base end 312 in the direction away from the parallel exposed surface 222. In this way, when the bent tip 311A of the inner end part 31A of the first connector terminal 3A is inserted into a control board 71, this inner end part 31A can be deflected resiliently to deform at least one of the base end part 312 and a boundary part between the base end 312 and the bent tip 311A. Thus, the insertion of the bent tip 311A of the inner end part 31A of the first terminal 3A into the control board 71 can be facilitated.

Further, when viewed in the mounting direction D in which the base ends 312 of the inner end parts 31A and the parallel exposed surface 222 are facing each other, the parallel exposed surface 222 of the first resin core 2A is dimensioned to entirely surround the inner end parts 31A of the first terminals 3A. In this way, when the outer resin part 4 is molded with the first resin core 2A inserted, the projecting exposed surface 221 and the parallel exposed surface 222 of the facing portion 22 of the first resin core 2A can be held to entirely surround the inner ends 31A of the first terminals 3A by the inner wall surface of the core holding portion 63 of the secondary mold 6. Thus, the secondary resin for molding the outer resin part 4 cannot intrude to the peripheries of the inner end parts 31A of the first terminals 3A. As a result, the connector case can be molded easily even though the inner end parts 31A of the first terminals 3A have a bent shape to face a connector case 1.

Other configurations, functions, effects and the like in the connector 1 of this embodiment and the manufacturing method thereof are similar to those in the first embodiment. Further, in this embodiment, constituent elements denoted by the same reference signs as in the first embodiment are similar to those in the first embodiment.

The invention is not limited to the above-described embodiments and different embodiments can be configured without departing from the scope of the invention. Further, the invention includes various modifications and modifications within the scope of equivalents. Furthermore, combinations of various constituent elements of the disclosure also are included in the scope of the invention.

LIST OF REFERENCE SIGNS 1 connector
2A, 2B, 2C core resin part
21A first exposed surface
21B second exposed surface
221 projecting exposed surface
222 parallel exposed surface
3A, 3B, 3C terminal
31A, 31B, 31C inner end part
311 tip
311A bent tip
312 base end
32A, 32B, 32C outer end part
4 outer resin part
6 secondary mold

What is claimed is:

1. A connector (1), comprising:
   terminals (3A, 3B);
   at least one resin core (2A, 2B) configured to cover remaining parts of the terminals (3A, 3B) with inner end parts (31A, 31B) and outer end parts (32A, 32B) of the terminals (3A, 3B, 3C) projecting therefrom; and
   an outer resin part (4) configured to cover a remaining part of the at least one resin core (2A, 2B) with exposed surfaces (21A, 21B, 221, 222) formed on a part of the at least one resin core (2A, 2B) exposed;
   wherein:
   the exposed surfaces (21A, 21B, 221, 222) include a projecting exposed surface (21A, 221), the inner end parts (31A, 31B) projecting from the projecting exposed surface (21A, 221), and a parallel exposed surface (21B, 222) perpendicular to the projecting exposed surface (21A, 221) and parallel to base ends (312) of the inner end parts (31A, 31B) with a clearance (S) formed between the base ends (312) and the parallel exposed surface (21B, 222);

bent tips (311A) projecting away from the parallel exposed surface (21B, 222) are formed on tips (311) of the inner end parts (31A, 31B); and the parallel exposed surface (21B, 222) has a size as to entirely surround the inner end parts (31A, 31B) of the terminals (3A, 3B) when viewed in a direction in which the inner end parts (31A, 31B) and the parallel exposed surface (22B, 222) are facing each other.

2. The connector (1) of claim 1, wherein:

the outer resin part (4) is formed as a cover to be mounted on an electronic control unit;

the inner end parts (31A, 31B) of the terminals (3A, 3B) project toward an inner side of the cover and are connected to the electronic control unit; and the outer end parts (32A, 32B) of the terminals (3A, 3B) project toward an outer side opposite to the inner side of the cover and are connected to a mating connector.

3. The connector (1) of claim 2, wherein the parallel exposed surface (22B, 222) forms a bottom surface of a recess recessed outwardly from an inner side surface of the outer resin part (4) forming the cover.

4. The connector (1) of claim 1, wherein:

the terminals (3A, 3B) include first terminals (3A) and second terminals (3B); and the at least one resin core (2A, 2B) includes a first resin core (2A) covering remaining parts of the first terminals (3A) with inner end parts (31A) and outer end parts (32A) of the first terminals (3A) projecting therefrom, and a second resin core (2B) covering remaining parts of the second terminals (3B) with inner end parts (31B) and outer end parts (32B) of the second terminals (3B) projecting therefrom, the connector further comprising:

the outer resin part (4) configured to cover a remaining part of the first resin core (2A) and a remaining part of the second resin core (2B) with a first exposed surface (21A) formed on a part of the first resin core (2A) and a second exposed surface (21B) formed on a part of the second resin core (2B) exposed, wherein:

base ends (312) of the inner end parts (31A) of the first terminals (3A) are facing the second exposed surface (21B) with a clearance (S) formed between the base ends (312) and the second exposed surface (21B);

bent tips (311A) are formed on tips (311) of the inner end parts (31A) of the first terminals (3A) and project away from the second exposed surface (21B); and the second exposed surface (21B) has a size to entirely surround the inner end parts (31A) of the first terminals (3A) when viewed in a direction in which the inner end parts (31A) of the first terminals (3A) and the second exposed surface (21B) are facing each other.

5. The connector (1) of claim 4, wherein:

the outer resin part (4) is formed as a cover to be mounted on an electronic control unit;

the inner end parts (31A) of the first terminals (3A) and the inner end parts (31B) of the second terminals (3B) project toward an inner side of the cover and are connected to the electronic control unit; and the outer end parts (32A) of the first terminals (3A) and the outer end parts (32B) of the second terminals (3B) project toward an outer side opposite to the inner side of the cover and are connected to a mating connector.

6. The connector (1) of claim 5, wherein the second exposed surface forms a bottom surface of a recess recessed outwardly from an inner side surface of the outer resin part (4) forming the cover.

* * * * *